United States Patent [19]
Thurston et al.

[11] 3,939,512
[45] Feb. 24, 1976

[54] MALE SCREW-FORMING MEMBERS

[76] Inventors: Walter Thurston, 28 Atwood Ave., Kew, Surrey; William Kerrigan, 22 Feltham Road, Ashford, Middlesex, both of England

[22] Filed: Nov. 21, 1974

[21] Appl. No.: 525,874

Related U.S. Application Data

[60] Division of Ser. No. 59,333, July 29, 1970, abandoned, which is a continuation of Ser. No. 760,924, Sept. 19, 1968, abandoned.

[52] U.S. Cl. .................... 10/10 R; 10/27 R; 85/46
[51] Int. Cl.$^2$.... B21H 3/02; B23G 9/00; B21K 1/44
[58] Field of Search..... 10/10 R, 27 R, 27 E, 152 T; 85/46, 47; 151/22

[56] References Cited
UNITED STATES PATENTS

| | | | |
|---|---|---|---|
| 3,246,556 | 4/1966 | Phipard | 85/46 |
| 3,342,234 | 9/1967 | Evans | 151/22 |
| 3,398,625 | 8/1968 | Ansingh | 85/46 |
| 3,426,642 | 2/1969 | Phipard | 85/46 |

*Primary Examiner*—C. W. Lanham
*Assistant Examiner*—E. M. Combs
*Attorney, Agent, or Firm*—Friedman & Goodman

[57] ABSTRACT

The specification discloses a method of making a male, screw-forming member, i.e., a member which forms a screw thread in a plain hole without cutting. The shank of the member is threaded and has three portions, a first portion of constant, circular cross section, a generally conical second portion of lobular cross section at the free end of the shank and a third portion of lobular cross section interposed between the first and second portions. The arrangement of the portions is such that the third portion forms a thread, in a plain hole of appropriate diameter, of greater effective diameter than the effective diameter of the thread on said first portion. The member is made by first threading the shank and then deforming the second and third portions to lobular cross-section.

1 Claim, 8 Drawing Figures

MALE SCREW-FORMING MEMBERS

CROSS REFERENCE TO RELATED APPLICATION

This application is a division of our application Ser. No. 59,333, filed July 29, 1970, the latter application being a continuation of our Application Ser. No. 760,924, filed Sept. 19, 1968 and now abandoned.

BACKGROUND OF THE INVENTION

1. Field of the Invention

There are two main types of such members. The first type cut a thread in a hole into which they are driven with the production of swarf and chips. The second type, which is the type with which the present invention is concerned, form or roll a female thread in a plain hole into which they are driven by displacement of the material in which the hole is formed and without the production of swarf or chips. Such members will hereinafter be referred to as "screw-forming" members.

2. Description of Prior Art

Various designs of such screw-forming members are at present in use or have been described in patent literature.

One such design has a cylindrical threaded shank with a tapered free end portion to form the female thread and the forming torque required, i.e., the torque required to drive the member into the hole to form the thread, is comparatively high.

Another design differs from the foregoing in having a series of circumferentially spaced flats on the tapered free end portion, such flats providing relief portions and thus reducing the forming torque required as compared with said one design. With said design, since the flats are on the taper their effectiveness in providing relief decreases progressively as the member enters the hole and binding between the flanks of the male and female thread progressively increases. The flats interrupt the thread form on the tapered free end portion so that between each adjacent pair of flats there is a threaded rib. As the member progresses into the hole, the crest of a threadturn on the leading edge of one rib interferes with the root of the female thread formed by the preceding thread rib causing binding and the possibility of cutting and the production of swarf.

In a further design the tapered free end portion of the shank is of lobular cross section as distinct from being of circular cross section with or without flats. The free end portion of the shank is formed to lobular cross section before it is threaded. The lobular cross section provides lobes which form the female thread and relief portions between the lobes. In the relief portions the female thread is totally relieved, i.e., on root, flanks and crest as compared with said other design with flats where as the member enters the hole, the flats give progressively less relief on the root and flanks of the female thread. Such further design has a desirably low forming torque.

Between the tapered free end or forming portion such members have a portion of thread which is considered to be a holding portion which, when the member is tightened, distorts with the female thread to hold the member tight. Some members have this holding portion of lobular cross section and this limits the stripping strength of the member since the engagement and distortion of the male and female threads on tightening is limited to areas provided by the lobes of the male threads. It is desirable to provide a holding portion of cylindrical cross section so that the maximum area of engagement of the male and female threads is obtained on tightening.

Such members usually form a female thread wherein the radial distances between the longitudinal axis of the shank and the roots and crests of the thread are substantially the same as the similar radial distances of the roots and crests respectively of the thread on the holding portion of the member. Where the holding portion is cylindrical this will be so throughout the whole of each thread turn but where the holding portion is of lobular cross section it will only be true of the male thread on the lobes.

However, in either case there is binding between the male thread on the holding portion and the formed female thread and when driving the member into the hole it is necessary to apply torque to overcome this binding in addition to the torque required to form the thread. The further the member penetrates into the hole the greater will be the total torque required since the torque required to overcome the binding will increase. In practice it is necessary to limit the total torque and this is achieved by specifying, for a given member, a greater diameter of starting hole the greater the required depth of penetration of the member. Obviously the greater the diameter of the hole the more truncated is the female thread produced therein thus reducing the total torque by reducing both the forming torque and the torque to overcome binding. The more truncated the female thread the less is the stripping strength of the fastening provided by the male and female members. In practice the truncation of the female thread may reach 50%.

A screw-forming member has also been proposed which has at the free end of the shank a tapered portion and then a thread forming portion having a thread which is slightly larger than, but has the same root diameter as, the thread on the holding portion of the shank. This will give desirable clearance between the formed female thread and the thread on the holding portion. However, the thread forming portion is circular in cross-section and the thread forming torque will be high. Moreover it is necessary to provide extra metal at the thread forming portion of the shank to be able to provide at said portion a larger thread having the same root diameter as the thread on the holding portion and such a construction does not lend itself to modern production practice on solid-die, bolt-forging machines.

A screw-forming member of circular section has also been proposed which has a thread forming portion with a thread whose root and crest diameters are greater than the corresponding diameters of the thread on the holding portion. This member is intended for use in sheet metal and the thread-forming torque would be too high to use this member in deep holes.

Some designs of member have a change of core section from lobular to cylindrical between the thread forming and holding portions and some have a change of thread size between said portions. With such designs non-standard and expensive thread rolling dies are necessary and a different die or a different combination of dies is necessary for each thread length required.

SUMMARY OF THE INVENTION

The invention is concerned with a simple and inexpensive method of making a screw forming member of the above form. The formation of a number of the screw forming members described in prior literature require the use of special thread-rolling dies and it is an object of the invention to provide a simple method of making a screw forming member without the use of such expensive and special dies.

According to the invention we provide a method of making a male, screw-forming member comprising; forming a blank with a shank having first and third-portions of substantially constant circular cross-section and a second portion at the free end of the shank and which tapers towards said end and has a generally conical surface, the third portion being interposed between the first and second portions; forming an intermediate product by forming a machine-screw thread of constant form on said shank and extending continuously from said free end onto said first portion, there being at least one complete turn of thread on said third portion; the crests of the thread on the first portion lying on a first imaginary surface which is generally cylindrical and co-axial with the shank; after the completion of the thread formation and as an operative separate therefrom, deforming said second and third portions of the threaded intermediate product by applying a radially inwardly directed force at positions spaced around the circumference of the blank by internally threaded dies, the sole relative movement between the blank and the dies being in a direction radially inwardly of the blank thus to move parts of the second and third portions inwardly relative to said axis to form relief portions with the consequent outflow of metal between such parts to provide a series of lobes each of which extends axially of the shank for the whole of the axial length of the second and third portions, the lobes being spaced circumferentially around the shank in axial alignment by the relief portions and being arranged such that; the crests of the thread on the lobes of the second portion have a second imaginary circumscribing surface which is generally conical, is coaxial with the shank and which tapers towards said free end; the crests of the thread on the lobes of the third portion have a third imaginary circumscribing surface which is generally cylindrical and co-axial with the shank; the radial distance of said third surface from the longitudinal axis of the shank is greater than the radial distance of said first surface from said axis; the roots of the thread on the first portion lie on a fourth imaginary surface and the roots of the thread on the lobes of the second and third portions lie on a fifth imaginery circumscribing surface, the fourth and fifth surfaces being cylindrical and co-axial with the shank; the radial distance of said fifth surface from the longitudinal axis of the shank being greater than the radial distance of said fourth surface from said axis; the crests of the thread on the axial relief portions of said third portion lie on a sixth imaginary inscribed surface, the roots of the thread on the axial relief portions of said second and third portions have a seventh imaginary inscribed surface, the sixth and seventh surfaces being generally cylindrical and coaxial with the shank; the radial distance of said sixth and seventh surfaces being less than the radial distances of the first and fourth surfaces from said axis respectively; and the crests of the thread on the axial relief portions of the second portion have an eighth imaginary inscribed surface which is generally conical, is coaxial with said shank and tapers to said free end; such that the thread on the lobes forms, in a plain hole of appropriate diameter, a female thread of a greater effective diameter than the effective diameter of the thread on said first portion.

By "generally conical surface" we mean a surface generated by a line, which may either be straight or curved, one end of which is held fixed while the other end moves around a closed curve.

Where we say that the thread is of "constant form" we mean that, where the thread is truncated, parts of the thread which exist are of the same form as the corresponding parts of the full thread. In other words the troughs of the truncated thread parts are of the same shape as the troughs of the full thread parts.

A member embodying the invention produces a female thread in a plain hole and in which the thread on the first portion of the member is received with clearance so that said portion does not bind on the female thread. For this reason, therefore, the torque required to drive the member into its hole depends solely on the diametral size and axial extent of the third portion and, since these are fixed dimensions of the member, the required driving torque will be substantially constant irrespective of the depth to which the member is driven. Moreover, holes of a given size may be specified for a given size of member irrespective of the depth to which it is to be driven.

It will be seen that this is a very simple method of making a screw-forming member since the member is made from a blank which is then threaded and the threaded blank is deformed to produce the lobes. This is in contradistinction to the methods of making many of the screw-forming members described in patent literature in which the lobes are formed on the blank before the latter is threaded and then difficulties are encountered in threading the blank. It will be seen that the lobes are not positively formed, therefore, but are formed by metal flow as a result of a positive formation of the relief portions.

Where press tools are used, these may be concave and have a radius of curvature which is greater than the effective diameter of the first portion of the member. Alternatively, the press tools may be of convex shape which may be that of a V with their sharp edges formed with a thread formation to engage the threads on said second and third portions. The press tools are preferably moved into engagement with the second and third portions in directions lying in planes containing the axis of the shank and perpendicular to such axis. The thread formation on the tools may be arranged to give clearance to the crests of the thread on the portions being deformed.

BRIEF DESCRIPTION OF THE DRAWINGS

The invention will now be described in detail by way of example with reference to the accompanying drawings in which, where shown, the lobes and relief portions are exaggerated to assist in describing the invention, and in which.

DESCRIPTION OF PREFERRED EMBODIMENT

Figure 1:
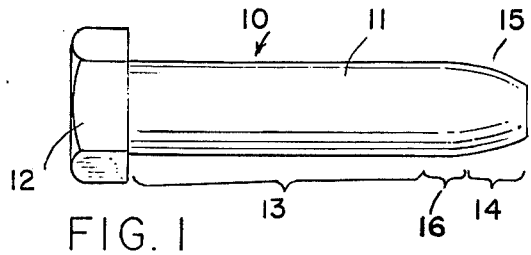
FIG. 1 is an elevation of a blank from which a screw embodying the invention can be made.

Referring now to FIG. 1, the blank is indicated generally at 10 and has a shank 11 and a head 12 at one end thereof. The shank 11 has a first portion 13 which is of constant circular cross-section; a second, tapered portion 14 at the free end of the shank and having a generally conical surface 15 formed by the revolution about the axis of the shank of an arc of a circle and a third portion 16 of circular cross section interposed between the first and second portions.

Figure 2:
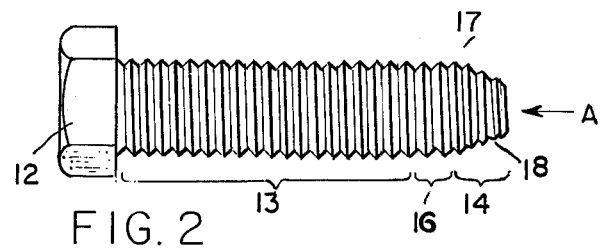
FIG. 2 is an elevation of the finished screw.

After the blank has been formed, its shank is thread rolled in a conventional manner to produce a continuous machine-screw thread extending from the free end of the shank to the head 12. The thread may terminate short of the head 12 if required but in either event there is at least one full turn of thread on the portion 16. The second and third portions 14 and 16 are then acted upon as will be described to form in them a series of three axially extended lobes, one of which is indicated at 17 in FIG. 2. Each lobe extends axially the whole length of the second and third portions and the lobes are equiangularly spaced around the circumference of the shank by relief portions 18.

Figure 3:
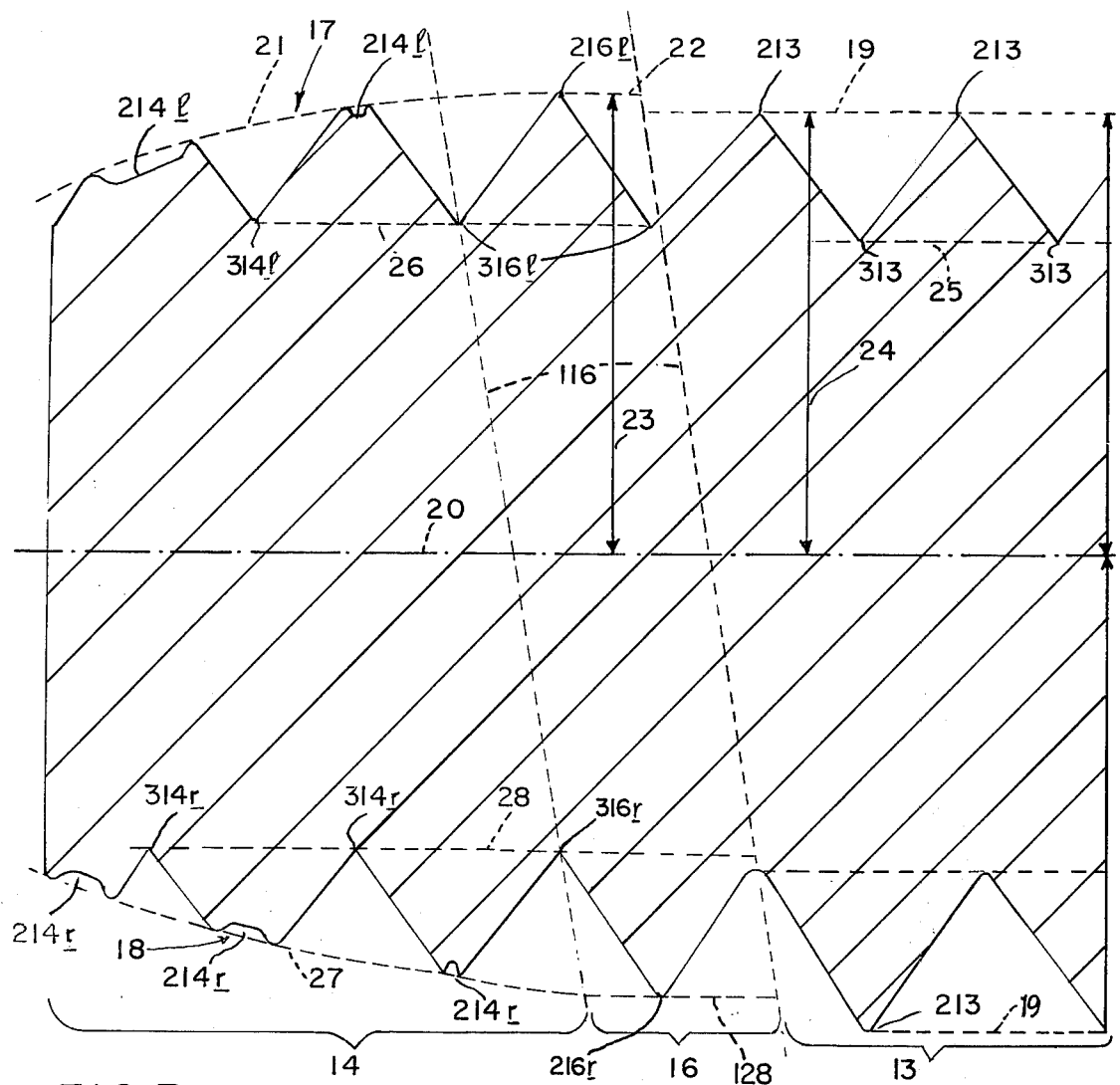
FIG. 3 is a section on the line 3—3 of FIG. 4 through the screw of FIG. 2.
Figure 4:
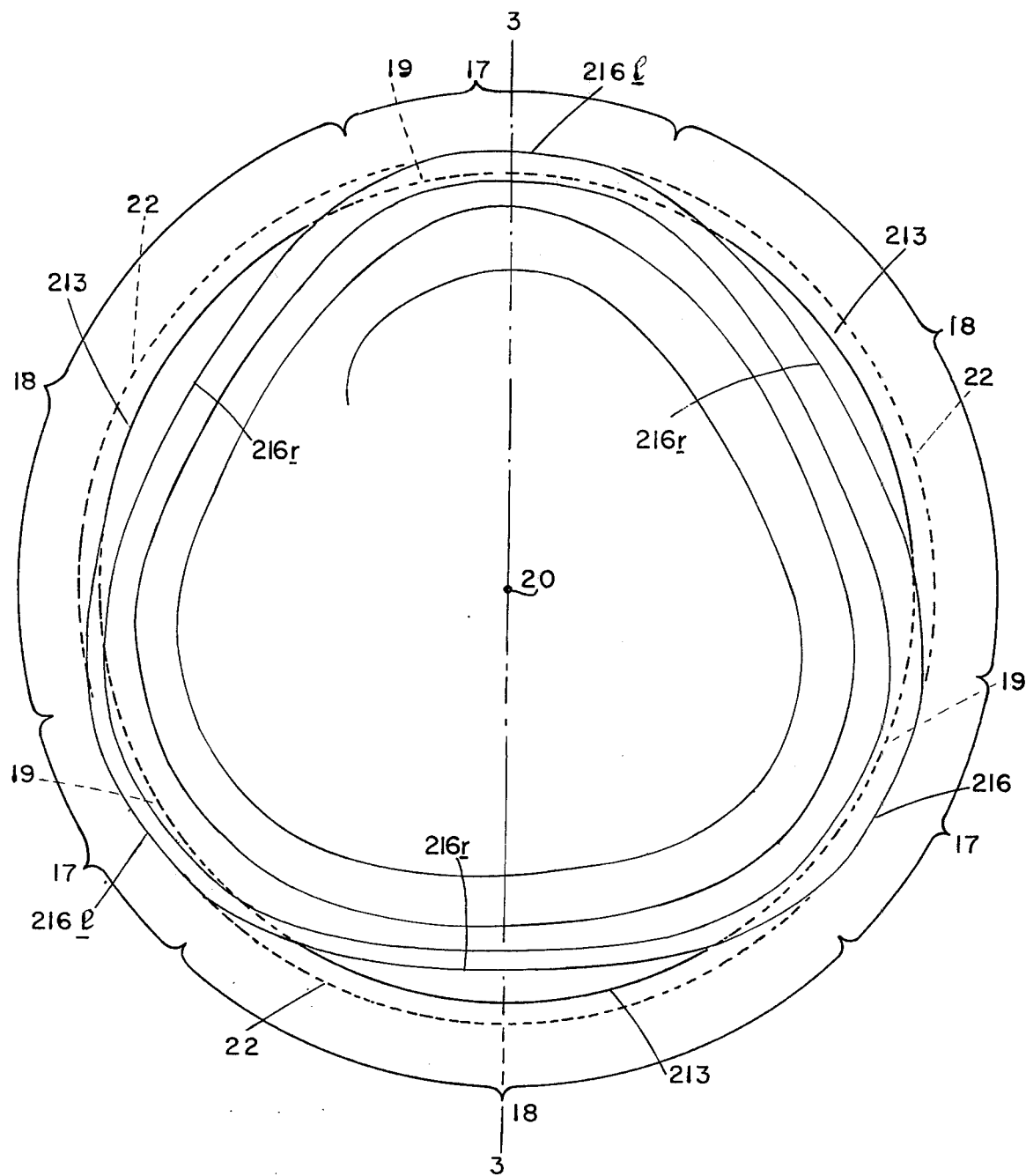
FIG. 4 is a diagrammatic end view of the screw taken in the direction of the arrow A of FIG. 2.

Referring to FIG. 4, the lobes are indicated by the bracket 17 and the relief portions between the lobes by the brackets 18. As will be described, the deformation positively forms the relief portions, the lobes being formed by the consequent out-flow of metal between the relief portions. Referring now to FIG. 3 the crests 213 of the thread on the first portion 13 of the shank lie on a first imaginary surface indicated at 19 and comprising a cylinder which is co-axial with the longitudinal axis 20 of the shank. The crests 214*l* of the thread on the lobes of the second portion 14 are circumscribed by a second imaginary, generally conical surface which is indicated by the dotted line 21; this surface is a surface of revolution of a circular arc about the longitudinal axis 20. The crests 216*l* of the thread on the lobes of the third portion 16 which lies between the dotted lines 116 in FIG. 3, lie on a third imaginary circumscribing surface 22 which is cylindrical and co-axial with the axis 20. The surface 22 is tangential to the surface 21, that is to say the surfaces if projected would touch in a tangent line. It will be seen from FIG. 3 that the thread form is constant throughout. That is to say that although some of the thread on the portion 14 is truncated, the shape of the parts of the thread which are there are identical to the corresponding parts of the thread on the first portion 13. The deformation of the parts 14 and 16 is such that the radial distance from the axis 20 to the third surface 22, which distance is indicated by the line 23 in FIG. 3, is greater than the distance, indicated by the line 24, from the axis 20 to the first surface 19. As will be seen from FIGS. 3 and 4 the crests of the thread on the lobes of the third portion 16; such crests being indicated at 216*l* in FIGS. 3 and 4, project, with respect to the axis 20, further than the crests indicated at 213 of the thread on the first portion 13 of the shank.

The roots 313 of the thread on the first portion 13 lie on a fourth imaginary cylindrical surface 25. The roots 314*l* and 316*l* of the thread on the lobes of the second and third portions have a fifth imaginary circumscribing surface 26. The surface 25 and 26 are co-axial with the axis 20 and the radial distance of the cylindrical surface 25 from the axis is less than the similar radial distance of the cylindrical surface 26.

The crests 216*r* of the thread in the relief portions of the third portion 16 have a sixth imaginary inscribed surface 128 and the roots 316*r* have a seventh imaginary inscribed surface 28, the surfaces 28 and 128 being generally cylindrical with the axis 20 as their longitudinal axis. The crests 214*r* of the thread in the relief portions 18 of the second portion 14 have an eighth imaginary co-axial inscribed surface 27 which is similar to the surface 21 but of smaller diameter and the roots 314*r* of the thread in said relief portions have as an imaginary inscribed surface the seventh surface 28.

The lobes 17 and relief portions 18 are formed by metal flow during deformation of the portions 14 and 16 and as a result the fifth cylindrical surface 26 has a greater diameter than the fourth cylindrical surface 25. Also the seventh cylindrical surface 28 has a smaller diameter than the fourth cylindrical surface 25. These relative dimensions of the surfaces 25, 26 and 28 are caused by inflow of metal in the relief portions 18 during deformation and consequent outflow of metal to form the lobes 17 with consequent radial displacement, relative to the part of the thread on the portions 13, of the parts of the thread on the portions 14 and 16.

It follows, due to the radially outward displacement of the crests 216*l* and roots 316*l* of the thread on the lobes of the third portion relative respectively to the crests 213 and roots 313 of the thread on the first portion 13, that when the screw is driven into a plain hole, the thread on the third portion 16 will form a female thread in the hole which has a greater effective diameter than the thread on the first portion 13 of the shank. There will thus be a clearance between the thread on the portion 13 and the female thread in the hole. It follows, that irrespective of the depth of the hole, the torque required to drive the screw will be constant once the third portion 16 has fully entered the hole. The torque required will gradually increase from first entry of the screw into the hole until the third portion 16 is fully in the hole, this gradual increase being due to the tapered second portion 14 which provides a lead up to what may be considered the thread sizing portion 16.

The screw has the advantage, therefore, that for a given size of screw a single size of hole can be specified irrespective of the depth to which the screw is to be driven and furthermore that the torque will be constant irrespective of the depth to which the screw is to be driven. The relief portions 18 between adjacent lobes 17 provide relief during the forming of the female thread in the hole by the portions 14 and 16.

As will be seen from inspection of FIG. 4 the crests 216 *l* on the lobes of the sizing portion 16 project beyond the first imaginary surface 19, i.e., beyond the crests of the thread on the first or holding portion 13 while the crests 216*r* on the axial relief portions of the sizing portion 16 lie well within said surface 19. As a result of this arrangement the lobes of the portion 16 can be shaped so as efficiently to form the thread while providing the necessary relief. This advantageous arrangement would not be possible if the crests 216*r* were outside the surface 19 since otherwise the lobes would be inefficiently shaped or, if efficiently shaped, would produce a female thread having too much clearance for standard fits on the holding portion 13.

The deformation of the previously threaded portions 14 and 16 may be carried out in a number of ways.

Figure 5:
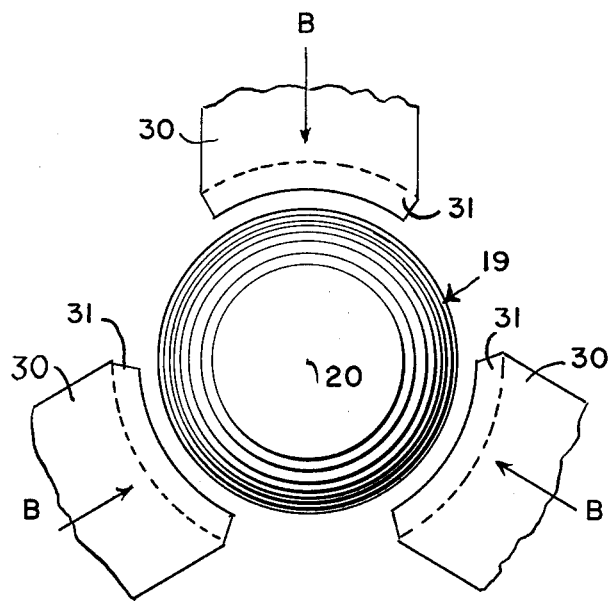
FIG. 5 is a diagrammatic end view indicating one method of deforming the blank.
Figure 6:
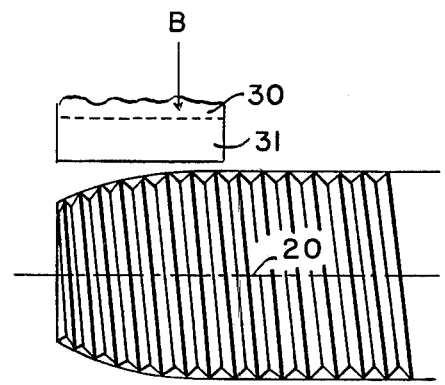
FIG. 6 is a view similar to FIG. 5 but in side elevation.
Figure 7:
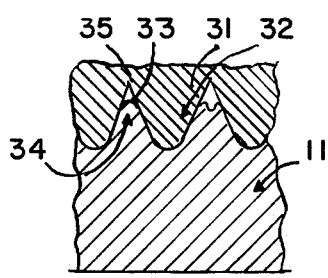
FIG. 7 is a detail section through the mating threads of one of the deforming tool and the screw blank.

Referring to FIGS. 5 and 6, the deformation may be carried out by three pads 30 having curved working surfaces 31 which have a thread which is substantially complementary to the thread on the portions 14 and 16. The radius of curvature of each of the surfaces 31 is greater than the radius of curvature of the surface 19. The pads 30 are moved in the directions of the arrows B in synchronism towards the axis 20 of the shank. As seen in FIG. 6, the surfaces 31 are co-axial with the shank 20 and the directions B lie in planes containing the axis 20 and perpendicular to such axis. As shown in FIG. 7, the thread 32 on the pads 30 is shaped so that there is relief as indicated at 33 between the crests 34 of the thread on the screw and the roots 35 of the thread on the pads.

There is positive inward movement of the metal of the shank under the inward movement of the pads 30 so that each pad forms a relief portion 18. There is a consequent outflow of metal between adjacent pads 30 and each such outflow forms a lobe 17.

Figure 8:
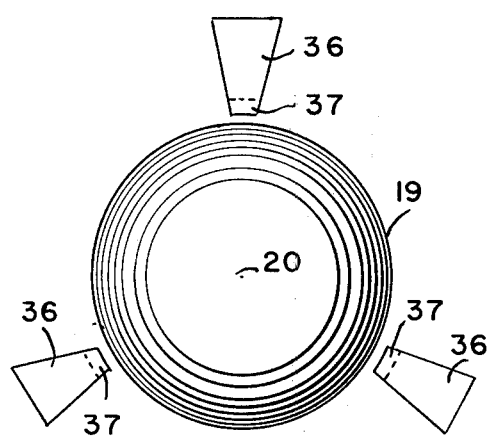
FIG. 8 is a view similar to FIG. 5 but showing a different form of deforming tool.

FIG. 8 shows a further arrangement in which, in place of the pads 30 having surfaces 31, three wedge-shaped members 36 are moved in synchronism towards the axis 20 of the shank, the wedge members 36 having threaded internal working surfaces 37 which are complementary to the thread on the portions 14 and 16 of the shank. Each member forms a relief portion 18 and a lobe 17 is formed between adjacent relief portions.

A screw-forming member has been described as having three lobes, however the member may have any convenient number of lobes.

We claim:
1. A method of making a male, screw-forming member comprising; forming a blank with a shank having first and third portions of substantially constant circular cross-section and a second portion at the free end of the shank and which tapers towards said end and has a generally conical surface, the third portion being interposed between the first and second portions; forming an intermediate product by forming a machine-screw thread of constant form on said shank and extending continuously from said free end onto said first portion, there being at least one complete turn of thread on said third portion; the crests of the thread on the first portion lying on a first imaginary surface which is generally cylindrical and coaxial with the shank; after the completion of the thread formation and as an operative separate therefrom, deforming said second and third portions of the threaded intermediate product by applying a radially inwardly directed force at positions spaced around the circumference of the blank by internally threaded dies, the sole relative movement between the blank and the dies being in a direction radially inwardly of the blank thus to move parts of the second and third portions inwardly relative to said axis to form relief portions with the consequent outflow of metal between such parts to provide a series of lobes each of which extends axially of the shank for the whole of the axial length of the second and third portions, the lobes being spaced circumferentially around the shank in axial alignment by the relief portions and being arranged such that; the crests of the thread on the lobes of the second portion have a second imaginary circumscribing surface which is generally conical, is coaxial with the shank and which tapers towards said free end; the crests of the thread on the lobes of the third portion have a third imaginary circumscribing surface which is generally cylindrical and co-axial with the shank; the radial distance of said third surface from the longitudinal axis of the shank is greater than the radial distance of said first surface from said axis; the roots of the thread on the first portion lie on a fourth imaginary surface and the roots of the thread on the lobes of the second and third portions lie on a fifth imaginary circumscribing surface, the fourth and fifth surfaces being cylindrical and coaxial with the shank; the radial distance of said fifth surface from the longitudinal axis of the shank being greater than the radial distance of said fourth surface from said axis; the crests of the thread on the axial relief portions of said third portion lie on a sixth imaginary inscribed surface, the roots of the thread on the axial relief portions of said second and third portions have a seventh imaginary inscribed surface, the sixth and seventh surfaces being generally cylindrical and coaxial with the shank; the radial distances of said sixth and seventh surfaces being less than the radial distance of the first and fourth surfaces from said axis respectively, and the crests of the thread on the axial portions of the second portion have an eighth imaginary inscribed surface which is generally conical, is coaxial with said shank and tapers to said free end; such that the thread on the lobes forms, in a plain hole of appropriate diameter, a female thread of a greater effective diameter than the effective diameter of the thread on said first portion.

* * * * *

UNITED STATES PATENT OFFICE
CERTIFICATE OF CORRECTION

Patent No. 3,939,512　　　　　　　　　Dated February 24, 1976

Inventor(s) Walter Thurston and William Kerrigan

It is certified that error appears in the above-identified patent and that said Letters Patent are hereby corrected as shown below:

On the cover sheet item [30] should read as follows.

| Sept. 23, 1967 | United Kingdom | 43376/67 |
| Jan. 2, 1968 | United Kingdom | 202/68 |
| Mar. 14, 1968 | United Kingdom | 12355/68 |

Signed and Sealed this eighth Day of June 1976

[SEAL]

Attest:

RUTH C. MASON
*Attesting Officer*

C. MARSHALL DANN
*Commissioner of Patents and Trademarks*